3,023,076
REMOVAL OF NITRIC OXIDE FROM GAS MIXTURES CONTAINING THE SAME

Ernst Karwat, Pullach im Isartal, Germany, assignor to Gesellschaft fur Linde's Eismaschinen Aktiengesellschaft, Munich, Germany, a company of Germany
No Drawing. Filed Aug. 11, 1958, Ser. No. 754,143
Claims priority, application Germany Sept. 3, 1957
8 Claims. (Cl. 23—2)

This invention relates to the art of gas purification, and is particularly concerned with the problem of removing nitric oxide from fluids—particularly gas mixtures—containing the same.

Nitric oxide and dienes (for example, cyclopentadiene) form polymerizable nitrosates and nitrosites, which make trouble in city gas, gas meters, valves and pipe lines, or which as spontaneously flammable resins are the cause of explosions in the decomposition of coke oven gas by low-temperature cooling. Nitric oxide in flue gas hinders the recovery of carbon dioxide from flue gas by low-temperature washing, since it starts the decomposition of the washing agent trichloroethylene. Nitric oxide in the recovered carbon dioxide makes the latter unusable for application in the blasting of steel in converters, because it remains in the steel as nitrogen. Nitric oxide which enters, from air contaminated with it, into the water circuit of a hydraulic washing plant, or which is formed by the action of bacteria in the water circuit of the hydraulic washing plant, is transferred during the washing to the washed gas, for example, a NO-free converted gas, and jeopardizes the subsequent decomposition of the low-temperature gas.

For washing nitric oxide from gas mixtures, such as coke oven gas, it has been suggested to use aqueous solutions of salts of low oxides of sulphur or of chromate and bichromate, respectively. But their action is incomplete and they have, therefore, not been used in the industry.

The object of the present application is to provide a method of operation whereby the nitric oxide is removed completely and economically from mixed gases containing low concentrations of NO-gas, such as coke oven gas, generator gas, flue gas. It is characterized in that gaseous chlorine dioxide, $ClO_2$, is mixed with the gas mixture which is to be freed from NO contained therein in low concentration, and that the resulting reaction products are removed from the resulting reaction mixture by washing the latter with an alkaline aqueous solution.

According to the invention gaseous $ClO_2$ is used for the removal of nitric oxide from the gas mixture. The chlorine dioxide is led into the gas stream to be purified by means of an inert carrier gas containing chlorine dioxide. The carrier gas is preferably a constituent of the gas mixture to be purified, for example, nitrogen. Chlorine is added to a carrier gas, like nitrogen, and the chlorine-containing carrier gas is conducted through an aqueous solution of $NaClO_2$, with two moles $ClO_2$ being formed from one mole chlorine, according to the reaction:

$$Cl_2 + 2NaClO_2 = 2NaCl + 2ClO_2$$

which pass over into the carrier gas which is subsequently fed to the gas mixture to be purfied. Despite the enormous dilution of the NO in the coke oven gas, viz., of the order of 1 part per million, the NO is oxidized practically completely to $NO_2$ and the latter as well as residues of chlorine compounds are removed by a subsequent alkaline reducing wash from the gas mixture to be purified, even if the volume of the chlorine dioxide fed to the gas is only ½ to 4 times the volume of the nitrc oxide to be destroyed. The amount of sodium chlorite is used up completely with the formation of $ClO_2$. The additional expenditure of gaseous chlorine is in the order of the amount of NO to be destroyed and is thus negligible from an economic point of view. Order of magnitude is from 0.5 to 3 cc. chlorine per cu.m. coke oven gas.

Subsequently to the reaction of the chlorine dioxide with the NO-containing gas mixture to be purified, the gas mixture is washed with soda, lye or other similar alkaline aqueous solution, e.g., an aqueous solution of thiosulphate or sodium sulphite. Such solutions remove both the $NO_2$ formed and eventual traces of chlorine or oxygen compounds of chlorine which may have escaped the reaction. The reducing wash has, however, neither the purpose nor the function to remove NO per se from the gas mixture, because the NO has already been oxidized to $NO_2$ in the first step of the two-step process.

The washing agent circulates between the bottom and top of the washing tower through a circulating pump. Another washing tower of a similar type as the first one serves the purpose to secure the purity of the washed gas when the washing efficiency of the solution of the first tower is becoming poor. When the washing performance of the first washing tower becomes exhausted, the second washing tower may be caused to function in place of the first one, and the existing first tower—after exchange of the washing agent for fresh solution—becomes tower No. 2.

*Example.*—50 cubic meters of nitrogen containing 0.01% (i.e., 5 liters) of chlorine are conducted, under a pressure of 12 atm. abs., through a saturation vessel in which are charged 50 liters of an aqueous solution of 10% by weight $NaClO_2$ at room temperature. The nitrogen leaves the vessel loaded with 10 liters chlorine dioxide, and is added to a current of 10,000 Nm.³ of coke oven gas containing 2% $CO_2$ and 1 part per million NO under a pressure of 12 atm. abs. After 2 to 6 seconds' mixing and reaction time, $CO_2$ is removed from the gas mixture in known manner and finally the gas mixture is washed with thiosulphate solution. The washed gas contains only harmless traces of NO or no NO at all.

The consumption of sodium chlorite, in this over-all operation, is about 40 g. $NaClO_2$.

As an example of the purification of city gas—in order to prevent the formation of gum in the apparatus, valves and pipe lines—there can be used the same values as in the preceding example for the purification of coke oven gas. Since the removal of $CO_2$ is not important here, rewashing with lye is omitted. Instead of thiosulphate, an aqueous solution of sodium sulphite is used for washing the gas treated with $ClO_2$, which is then subjected to a re-washing process with water before it is fed to the distribution network. The costs are so low that the present process is one of the cheapest gas-purifying processes. The benefits of its application are that (a) in city gas networks the annoying and cost-increasing gumming is eliminated, and (b) that in low-temperature gas decomposition plants the danger of explosions by nitrosites is avoided.

I claim:

1. A process for removing NO from an NO-containing gas mixture comprising oxidizable organic components, which comprises the steps of (a) adding gaseous $ClO_2$ to the gas mixture and (b) washing out the resulting reaction products with an aqueous alkaline solution.

2. Process as defined in claim 1, characterized by adding to the NO-containing gas mixture gaseous chlorine dioxide diluted with an inert carrier gas.

3. Process as defined in claim 2 in which the carrier gas is nitrogen.

4. Process as defined in claim 1, in which the reaction products of the first step are washed out with an aqueous alkaline solution containing a reducing agent.

5. Process as defined in claim 4, in which the reducing agent is thiosulphate.

6. Process as defined in claim 4, in which the reducing agent is sodium sulphite.

7. Process for removing NO from an NO-containing gas mixture comprising oxidizable organic components, which comprises adding a chlorine dioxide-containing carrier gas to the gas mixture and washing out the resulting reaction products with an aqueous alkaline solution and thereafter with an aqueous solution of thiosulphate.

8. Process for removing NO from an NO-containing gas mixture comprising oxidizable organic components and carbon dioxide and simultaneously preserving the bulk of the carbon dioxide of such gas mixture, which comprises adding a chlorine-dioxide-containing carrier gas to the said gas mixture and washing out the resulting reaction products with an aqueous solution of sulphite.

References Cited in the file of this patent

UNITED STATES PATENTS

| | | |
|---|---|---|
| 1,888,547 | Bent | Nov. 22, 1932 |
| 2,745,714 | Woodward | May 15, 1956 |
| 2,856,259 | Bollinger | Oct. 14, 1958 |

OTHER REFERENCES

Mellor: "A Comprehensive Treatise on Inorganic and Theoretical Chemistry," Longmans, Green and Co., N.Y., vol. 8, 1928, p. 433.